(12) United States Patent
Wyville

(10) Patent No.: US 9,001,947 B2
(45) Date of Patent: Apr. 7, 2015

(54) LINEARIZATION OF MULTI-ANTENNA RECEIVERS WITH RF PRE-DISTORTION

(75) Inventor: Mark Wyville, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 482 days.

(21) Appl. No.: 13/347,278

(22) Filed: Jan. 10, 2012

(65) Prior Publication Data

US 2013/0177116 A1 Jul. 11, 2013

(51) Int. Cl.
H04B 1/10 (2006.01)

(52) U.S. Cl.
CPC ..................................... H04B 1/109 (2013.01)

(58) Field of Classification Search
CPC ........................................................ H03L 7/081
USPC .......................................................... 375/349
See application file for complete search history.

(56) References Cited

U.S. PATENT DOCUMENTS

| | | | | |
|---|---|---|---|---|
| 3,781,475 | A * | 12/1973 | Sharp | 381/62 |
| 6,792,250 | B1 | 9/2004 | Zarubin | |
| 7,034,636 | B2 * | 4/2006 | Shamsaifar et al. | 333/174 |
| 7,697,913 | B2 * | 4/2010 | Shatara | 455/296 |
| 7,840,199 | B2 * | 11/2010 | Krishnaswamy et al. | 455/147 |
| 2001/0027095 | A1 | 10/2001 | Wang | |
| 2003/0224751 | A1 | 12/2003 | Vanderhelm et al. | |
| 2006/0074558 | A1* | 4/2006 | Williamson et al. | 701/213 |
| 2008/0081588 | A1 | 4/2008 | Rofougaran | |
| 2010/0178874 | A1 | 7/2010 | Chiou et al. | |
| 2010/0214063 | A1 | 8/2010 | Rofougaran | |

FOREIGN PATENT DOCUMENTS

EP 1914882 A1 4/2008

OTHER PUBLICATIONS

Written Opinion of the International Preliminary Examining Authority, PCT/IB2013/000026, Jan. 31, 2014, 7 pages.
Notification of Transmittal of the International Search Report and the Written Opinion of the International Searching Authority, or the Declaration, PCT/IB2013/000026, Jun. 28, 2013, 13 pages.
E. A. Keehr, et al., "A Rail-To-Rail Input Receiver Employing Successive Regeneration and Adaptive Cancellation of Intermodulation Products", IEEE *Radio Frequency Integrated Circuits Symposium*, pp. 47-50, Jun. 2010.
E. A. Keehr, et al., "A Rail-To-Rail Input Receiver Employing Successive Regeneration and Adaptive Cancellation of Intermodulation Products," *IEEE Radio Frequency integrated Circuits Symp.*, pp. 47-50, Jun. 2010.

(Continued)

*Primary Examiner* — Lihong Yu
(74) *Attorney, Agent, or Firm* — Myers Bigel Sibley & Sajovec, P.A.

(57) ABSTRACT

A receiver includes a first receiver chain configured to receive a first input signal and a second receiver chain configured to receive a second input signal. A first phase predistorter is provided in the first receiver chain and is configured to shift a phase of the first input signal by a first phase shift $\phi'_A(f)$. A combiner is coupled to the first receiver chain and the second receiver chain and combines the first and second input signals. The first phase shift is selected to cause undesired signal components received in the first and second input signals to combine destructively.

12 Claims, 7 Drawing Sheets

(56) References Cited

OTHER PUBLICATIONS

M. Valkama, et al., "Advanced Digital Signal Processing Techniques for Compensation of Nonlinear Distortion in Wideband Multicarrier Radio Receivers," *IEEE Trans. Microwave Theory Tech*, vol. 54, No. 6, pp. 2356-2366, Jun. 2006.

International Preliminary Report on Patentability, PCT/IB2013/000026, Apr. 17, 2014, 19 pages.

* cited by examiner

LINEARIZATION OF MULTI-ANTENNA RECEIVERS WITH RF PRE-DISTORTION

FIELD OF THE INVENTION

The present invention relates to RF receivers, and in particular to RF receivers including multiple antennas.

BACKGROUND

A conventional receiver operates over a specific frequency band, which is called the passband. The receiver components have a limited dynamic range over which they operate linearly. If the signals in the receiver are large enough to exceed this dynamic range then the receiver exhibits some non-linear behaviour. This behavior includes mixing between different signals, and self-mixing of each large signal.

Mixing between different signals results in intermodulation distortion (IMD), while self mixing of a signal results in harmonic distortion (HD). The IMD and HD can fall directly into the passband, which degrades the signal to noise ratio (SNR), since this distortion appears as noise in the desired signal.

A duplexer or bandpass filter is placed at the input to the receiver to attenuate signals outside the passband. If these undesired signals are not significantly attenuated then they can exceed the dynamic range of the receiver and generate IMD and HD throughout the receiver components.

A number of techniques have been proposed to avoid the SNR degradation caused by IMD and HD. For example, one approach is to attenuate undesired signal components in a received signal before passing the received signal through a non-linear receiver component. This includes increasing the performance of the input bandpass filter, or supplementing it with some tunable notch filters.

Another approach is to improve the linearity of all receiver components. This typically includes designing the components to handle larger power levels, which corresponds to increasing the dynamic range.

Yet another approach is to estimate the IMD and HD and subtract it from the received signal. This requires estimating the IMD and HD that falls into the passband. The estimation may be performed using non-linear RF/analog components along with digital signal processing (DSP). See, e.g., E. A. Keehr, et al., "A Rail-To-Rail Input Receiver Employing Successive Regeneration and Adaptive Cancellation of Intermodulation Products," IEEE Radio Frequency integrated Circuits Symp., pp. 47-50, June 2010, and M. Valkama, et al., "Advanced Digital Signal Processing Techniques for Compensation of Nonlinear Distortion in Wideband Multicarrier Radio Receivers," IEEE Trans. Microwave Theory Tech, vol. 54, no. 6, pp. 2356-2366, June 2006.

These techniques may also be useful when linearity requirements are already met. However, it is desirable to relax the duplexer filtering requirements, as increasing the performance of the input bandpass filter may result in a filter that has a larger size and significantly higher cost. Large duplex filters are undesirable, especially in multiple antenna architectures. Supplementing the duplex filter with one or more tunable notch filters typically results in a higher insertion loss, which is undesirable before the signal passes through the low noise amplifier (LNA).

Increasing the dynamic range of all receiver components can increases the power consumption, size and/or cost of the receiver.

The techniques that estimate the IMD and HD can significantly increase the DSP requirements of a receiver. The accuracies of the estimates depend on the interference environment. These techniques generally require additional analog to digital converters (ADCs) and RF/analog components, which can increase cost, size and/or power consumption.

These existing solutions become more problematic for wideband receivers. In a wideband receiver, large interferers may be present within channels that are intentionally passed by the RF bandpass filter, even if the portions of those channels in which the interferers appear are not used by the radio in a specific configuration.

SUMMARY

Some embodiments provide a receiver including a first receiver chain configured to receive a first input signal, a second receiver chain configured to receive a second input signal, a first phase predistorter in the first receiver chain configured to shift a phase of the first input signal by a first phase shift $\phi'_A(f)$, and a combiner coupled to the first receiver chain and the second receiver chain and configured to combine the first and second input signals. The first phase shift is selected to cause undesired signal components induced in the first and second input signals by nonlinear processing in the receiver to combine destructively.

The receiver may further include a second phase predistorter in the second receiver chain configured to shift a phase of the second input signal by a second phase shift $\phi'_B(f)$. The first phase shift and the second phase shift may be jointly selected to cause the undesired signal components in the first and second input signals to combine destructively.

The undesired signal components may include intermodulation distortion (IMD) products of a first undesired signal and a second undesired signal. A phase difference between a first one of the IMD products in the first input signal and a second one of the IMD products in the second input signal may have the form $$\Delta'_{\phi,IM3} = 2\Delta'_{100}(f_2) - \Delta'_{\phi}(f_1)$$

wherein $\Delta'_{100}(f)$ is defined as $(\phi_A(f) + \phi'_A(f)) - (\phi_B(f) + \phi'_B(f))$, $f_1$ is a fundamental frequency of the first undesired signal, $f_2$ is a fundamental frequency of the second undesired signal, and wherein $\phi'_A(f)$ and $\phi'_B(f)$ are selected such that $\Delta_{\phi,IM3}$ is about +/−180 degrees.

The receiver may further include a control circuit coupled to the combiner and to the first phase predistorter and configured to control a phase shift of the first phase predistorter.

The combiner may be further configured to multiply the first and second input signals by weights to form weighted input signals and to combine the weighted input signals to form a combined input signal.

The receiver may further include a control circuit coupled to the combiner and to the first phase predistorter and configured to control a phase shift of the first phase predistorter and configured to generate the complex weights. The complex weights may be selected to increase the destruction of the undesired signal components in the first and second weighted input signals when the first and second weighted input signals are combined.

The first receiver chain may include a low noise amplifier, and the first phase predistorter may be provided in the first receiver chain between the first input and the low noise amplifier.

In some embodiments, the first phase predistorter may be provided in the first receiver chain after the low noise amplifier.

The first receiver chain may include a mixer, and the first phase predistorter may be provided in the first receiver chain between the low noise amplifier and the mixer.

The second receiver chain may not include a phase predistorter in some embodiments.

The first phase predistorter may include an all-pass filter having a tunable phase response. In some embodiments, the first phase predistorter may include a lattice filter. The first phase predistorter may be free of active circuit components.

A receiver according to further embodiments includes a first antenna configured to receive a first input signal, a second antenna configured to receive a second input signal, a first phase predistorter coupled to the first antenna and configured to receive the first input signal and shift a phase of the first input signal by a first phase shift $\phi'_A(f)$, a combiner configured to combine the first and second input signals, and an amplifier coupled between the first phase predistorter and the combiner. The first phase shift may be selected to cause undesired signal components induced in the first and second input signals by nonlinear processing in the receiver to combine destructively.

A method of processing receive signals according to some embodiments includes receiving a first input signal, receiving a second input signal, shifting a phase of the first input signal by a first phase shift $\phi'_A(f)$, and combining the first and second input signals. The first phase shift may be selected to cause undesired signal components induced in the first and second input signals by nonlinear processing to combine destructively.

The method may further include shifting a phase of the second input signal by a second phase shift $\phi'_B(f)$. The first and second phase shifts may be selected to cause undesired signal components caused by the passing the first and second input signals through non-linear components to combine destructively.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Figure 1:
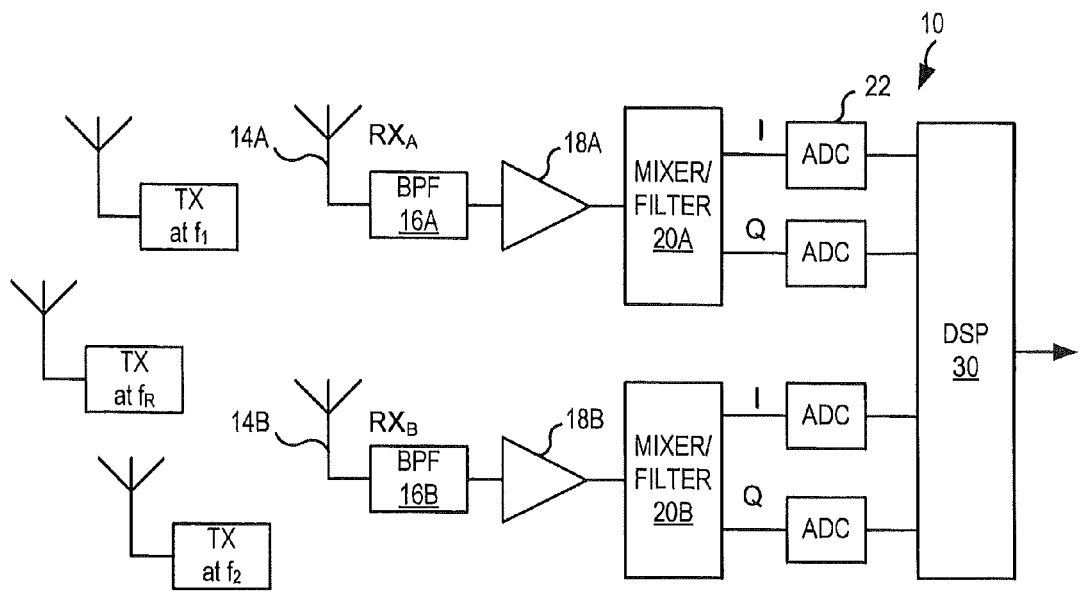
FIG. 1 is a block diagram of a conventional multi-antenna receiver.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

In a multi-antenna receiver including separate receive (RX) chains, the signals from the separate receive chains are combined in a digital signal processor (DSP). (It will be appreciated that the acronym 'DSP' can refer to digital signal processing or digital signal processor, depending on the context in which it is used.) In the RX passband, the desired signals across the different RX chains are correlated, while undesired signals (such as thermal noise) are typically assumed to be uncorrelated. Some combiners adjust the amplitude and/or phase of the received signals prior to combining in an attempt to cause the correlated (desired) portions of the received signals to add constructively. This approach is used in techniques such as maximal ratio combining and equal gain combining, for example.

However, the undesired signals within the RX passband may also include intermodulation distortion (IMD) and harmonic distortion (HD) components, which may be correlated across the different RX chains.

According to some embodiments, an RF phase pre-distorter that induces a frequency dependent phase shift in the received signal is provided in one or more receive chains. The RF phase pre-distorter may be provided prior to the first component in the receive chain that exhibits a significant non-linearity. The phase shift introduced by the RF phase pre-distorter may be designed in a manner such that when the output signals of multiple receive chains are combined, the desired passband signals add constructively while the undesired passband signals add destructively. In some embodiments, RF phase pre-distorters may be provided in more than one receive chain in a multi-antenna receiver. The undesired passband signals refer to the IMD generated by the non-linear components in each RX chain.

The following acronyms are used in the discussion below.
ADC—analog to digital converter
BPF—bandpass filter DSP—digital signal processing; digital signal processor HD—harmonic distortion (caused by self-mixing of a signal)

IM3—3rd order intermodulation distortion

IMD—intermodulation distortion (caused by mixing of different signals)

LNA—low noise amplifier

RFPPD—RF phase pre-distorter

RX—receiver

SNR—signal to noise ratio

TX—transmitter

FIG. 1 illustrates a conventional multi-antenna receiver 10 that may be susceptible to IMD and HD interference. The receiver 10 includes two receive chains $RX_A$ and $RX_B$, that include respective antennas 14A, 14B, bandpass filters 16A, 16B, and low noise amplifiers (LNAs) 18A, 18B, that receive, filter and amplify RF signals. The amplified signals are then passed through respective mixer/filter blocks 20A, 20B, that filter and mix the signals to an intermediate frequency or to baseband. The outputs of the mixer/filter blocks 20A, 20B are complex signals including respective in-phase (I) and quadrature (Q) components, which are sampled by analog to digital converters 22 and provided as digital signals to a digital signal processor 30.

Figure 2A:
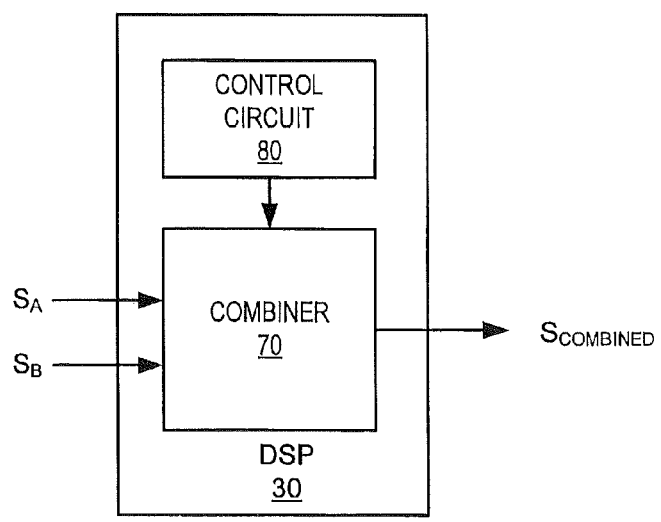
FIG. 2A illustrates a digital signal processor in accordance with some embodiments.

Referring to FIG. 2A, the DSP 30 may include a control circuit 80 and a combiner 70. The control circuit 80 controls operations of the combiner 70. The combiner receives the complex digital signals $S_A$ and $S_B$ and combines them to form a combined signal $S_{COMBINED}$ from which transmitted data can be estimated.

Figure 2B:
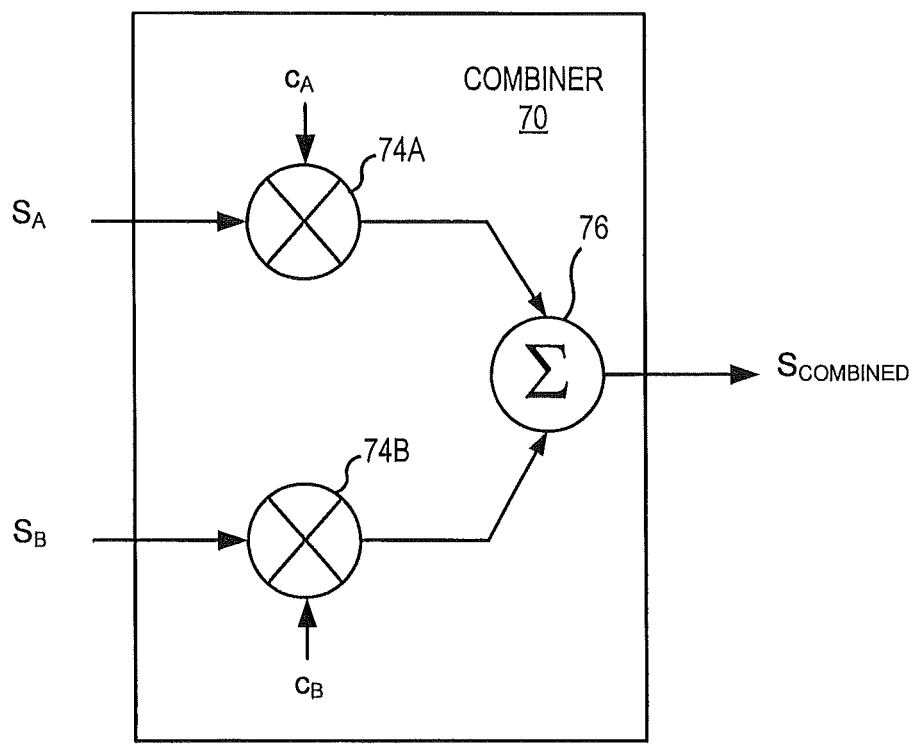
FIG. 2B illustrates a combiner in accordance with some embodiments.

The combiner 70 is illustrated in more detail in FIG. 2B. As shown therein, the combiner 70 receives the complex digital signals $S_A$ and $S_B$, multiplies the complex digital signals $S_A$ and $S_B$ by respective complex weights $c_A$, $c_B$ in multipliers 74A, 74B to form weighted complex signals, and combines the weighted complex signals in a summer 76 to form the combined signal $S_{COMBINED}$ from which transmitted data can be estimated. The complex weights $c_A$, $c_B$ may be provided to the combiner 70 by the control circuit 80.

Referring again to FIG. 1, a desired signal is transmitted to the receiver 10 by a transmitter. The desired signal is centered at a frequency $f_R$. However, two large interfering transmitters are also present. The interfering transmitters transmit signals centered at frequencies at $f_1$ and $f_2$, respectively. These interfering signals may be received by the antennas 14A, 14B. As long as the frequencies f1 and f2 are outside the passband of the band pass filters 16A, 16B, their center frequencies will be attenuated and not passed to the LNAs 18A, 18B where they could cause nonlinearity in the receiver 10. It is also common that large signals outside the passband are not sufficiently attenuated by the bandpass filters. They are still passed to the LNAs 18A, 18B, but at a weaker strength.

However, IMD products of the undesired signals may fall within the passband of the band pass filters 16A, 16B.

A signal transmitted to the receiver 10 may be received at the antennas 14A, 14B with a phase shift between the two received signals. The phase shifts between each signal source and the LNA 18A, 18B in the first and second RX chains $RX_A$, $RX_B$ are denoted $\phi_A(f)$ and $\phi_B(f)$, respectively for $f=f_1,f_2$ and $f_R$. The phase shifts $\phi_A(f)$ and $\phi_B(f)$ may occur naturally, for example, due to path length differences from the transmitters to the two receive antennas.

An IM3 product of signals having frequencies $f_1$ and $f_2$ appears at a frequency equal to $2f_2-f_1$. If the values of $f_1$ and $f_2$ are such that the value $2f_2-f_1$ falls within the passband of the bandpass filters 16A, 16B, then an IM3 product from the two large interferers will fall directly into the RX passband at the output of each LNA. The linear and IM3 signals at the output of each LNA in the RX passband are:

$$LNA_{A,out} = \alpha_{AD}A_D(t)\cos[2\pi f_R t + \phi_D(t) + \phi_A(f_R)] + \alpha_{AU}A_U(t)\cos[2\pi(2f_2-f_1)t + \phi_U(t) + 2\phi_A(f_2) - \phi_A(f_1)] \quad [1a]$$

$$LNA_{B,out} = \alpha_{BD}A_D(t)\cos[2\pi f_R t + \phi_D(t) + \phi_B(f_R)] + \alpha_{BU}A_U(t)\cos[2\pi(2f_2-f_1)t + \phi_U(t) + 2\phi_B(f_2) - \phi_B(f_1)] \quad [1b]$$

Equations [1a] and [1b] Linear and IM3 signals at the LNA outputs of RX chains A and B In Equations [1a] and [1b], the subscripts U and D denote undesired and desired signals, respectively. The time dependent amplitude and phase terms $[A_D(t), \phi_D(t), A_U(t), \phi_U(t)]$ correspond to the amplitude and phase modulation of the different signals. The $\alpha$ terms are used to model different amplitudes of the signals at the two different antennas.

Thus, for example, Equation [1a] indicates that the signal $LNA_{A,OUT}$ appearing at the output of LNA 18A is composed of a desired signal component centered at frequency $f_R$ that is shifted by a frequency dependent phase shift $\phi_A(f_R)$ and an undesired signal component centered at frequency $(2f_2-f_1)$ that is shifted by a frequency dependent phase shift $2\pi_B(f_2)-\phi_B(f_1)$. The signal $LNA_{B,OUT}$ appearing at the output of LNA 18Bf has a similar form.

For the desired linear signals to add constructively, the output of chain B should be phase shifted by $\phi_A(f_R)-\phi_B(f_R)$ before being summed with the output of chain A. However, phase shifting the signal received in receive chain $RX_B$ by this amount results in a phase difference between the undesired IM3 terms at the combiner equal to:

$$\Delta_{\phi,IM3} = [2\phi_A(f_2)-\phi_A(f_1)] - [2\phi_B(f_2)-\phi_B(f_1)] - [\phi_A(f_R)-\phi_B(f_R)] \quad [2]$$

Equation 2—Phase difference of IM3 terms at combiner

This equation can be simplified by introducing a new variable, $\Delta_{100}(f)$, which is defined as:

$$\Delta_\phi(f) = \phi_A(f) - \phi_B(f) \quad [3]$$

This term represents the phase difference of specific signals between the two LNA inputs. This term has a unique value for each signal (i.e. both interferers and the desired receive signal). Using Equation [3], Equation [2] can be simplified as follows:

$$\Delta_{\phi,IM3} = 2\Delta_{100}(f_2) - \Delta_{100}(f_1) - \Delta_\phi(f_R) \quad [4]$$

Equation 4—Simplified phase difference of IM3 terms at combiner

According to some embodiments, this relationship may be exploited to suppress 3rd order IMD (IM3) components in the combined signal. To reduce IM3 interference, the phase difference defined in Equation [4] may be set at nearly 180°, which will cause the IM3 terms to add destructively. To ensure the phase difference of the IM3 ($\Delta_{\phi,IM3}$) is nearly 180°, RF components with controllable phase responses are placed before the LNAs.

Figure 3:
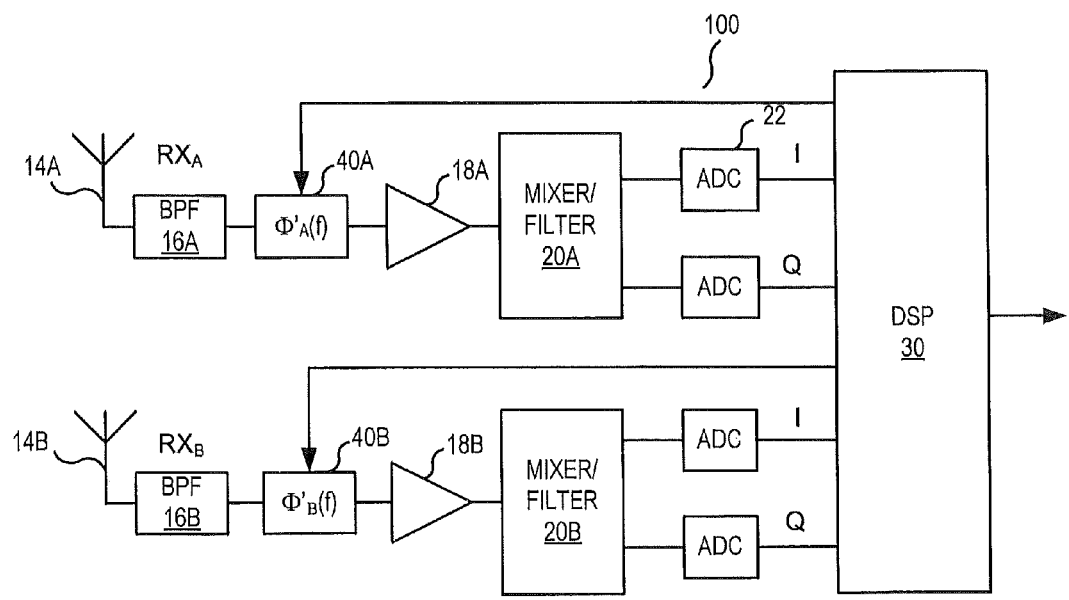
FIG. 3 is a block diagram of a multi-antenna receiver in accordance with some embodiments.

Referring to FIG. 3, a receiver 100 according to some embodiments is illustrated. The receiver 100 includes two receive chains $RX_A$ and $RX_B$, that include respective antennas 14A, 14B, bandpass filters 16A, 16B, low noise amplifiers (LNAs) 18A, 18B, mixer/filter blocks 20A, 20B, analog to digital converters 22 and a digital signal processor 30. These components operate as described above with respect to FIG. 1.

In addition, the receiver 100 includes first and second RF phase pre-distorters (RFPPD) 40A, 40B in the receive chains $RX_A$ and $RX_B$. In the embodiments illustrated in FIG. 3, the RFPPDs 40A, 40B are provided in the receive chains $RX_A$ and $RX_B$ after the bandpass filters 16A, 16B and before the LNAs 18A, 18B.

Tuning the RFPPDs 40A, 40B varies $\Delta_{100}(f_1)$, $\Delta_{\phi(f2)}$ and $\Delta_{100}(f_R)$. In particular, the phase distortion caused by RFP-PDs 40A, 40B is done in a manner to cause $\Delta_{100,IM3}$ to be equal to +/−180°. Tuning of the RFPPDs 40A, 40B may be performed by the controller 80 in the DSP 30. The combiner 70 in the DSP 30 applies the appropriate complex weights $c_A$, $c_B$ to the different RX chain outputs prior to combining the signals.

With the RFPPDs 40A, 40B included in the receiver 100, the equations for the signals at the outputs of the LNAs 18A, 18B become:

$$LNA_{A,out} = \alpha_{AD}A_D(t)\cos[2\pi f_R t + \phi_D(t) + \phi_A(f_R) + \phi'_A(f_R)] + \alpha_{AU}A_U(t)\cos[2(f_2-f_1)t + \phi_U(t) + 2(\phi_A(f_2) + \phi'_A(f_2)) - (\phi_A(f_1) + \phi'_A(f_1))] \quad [5a]$$

$$LNA_{B,out} = \alpha_{BD}A_D(t)\cos[2\pi f_R t + \phi_D(t) + \phi_B(f_R) + \phi'_B(f_R)] + \alpha_{BU}A_U(t)\cos[2\pi(2f_2-f_1)t + \phi_U(t) + 2(\phi_B(f_2) + \phi'_B(f_2)) - (\phi_B(f_1) + \phi'_B(f_1))] \quad [5b]$$

The phase difference between the undesired components between the two receive chains is then:

$$\Delta_{\phi,IM3} = [2(\phi_A(f_2) + \phi'_A(f_2)) - (\phi_A(f_1) + \phi'_A(f_1))] - [2(\phi_B(f_2) + \phi'_B(f_2)) - (\phi_B(f_1) + \phi'_B(f_1))] \quad [6]$$

Equation [6] can be rearranged as:

$$\Delta_{\phi,IM3} = 2[(\phi_A(f_2) + \phi'_A(f_2)) - (\phi_B(f_2) + \phi'_B(f_2))] - [(\phi_A(f_1) + \phi'_A(f_1)) - (\phi_B(f_1) + \phi'_B(f_1))] \quad [7]$$

Equation [6] can be expressed in simplified form as:

$$\Delta_{\phi,IM3} = 2\Delta'_\phi(f_2) - \Delta'_\phi(f_1) \quad [8]$$

where $$\Delta'_{100}(f) \text{ is defined as } (\phi_A(f) + \phi'_A(f)) - (\phi_B(f) + \phi'_B(f)) \quad [9]$$

As the DSP 30 can determine $\phi_A(f)$ and $\phi_B(f)$, the DSP can determine appropriate values of $\phi'_A(f)$ and $\phi'_B(f)$ such that $\Delta_{\phi,IM3}$ becomes equal to +/−180°.

For adequate suppression of the IM3 terms, the IM3 signals may be weighted so that they have equal magnitudes at the combiner 70. This means the amplitude weights at the combiner may not be chosen to maximize constructive addition of the desired signal, but instead may in some embodiments be chosen to cause the IM3 signals to combine destructively.

Figure 4A:
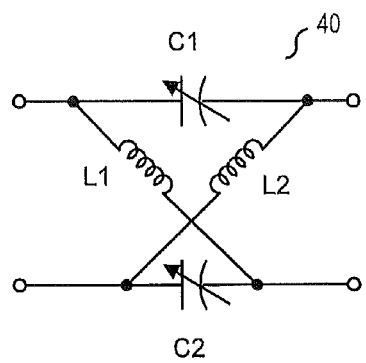
FIGS. 4A and 4B are diagrams of all-pass filters with a tunable phase response that can be used to provide phase-predistortion in accordance with some embodiments.

IMD components from multiple interferers can be suppressed if the phase can be chosen arbitrarily as a function of frequency. Accordingly, the RFPPDs 40A, 40B may be implemented using all-pass filters with a tunable phase response. A tunable all-pass filter typically includes tunable components, such as variable capacitors (varactors). A tunable all pass filter may be implemented, for example, as a lattice structure using passive components. A tunable all pass filter 40 is illustrated, for example, in FIG. 4A. The tunable all pass filter 40 shown in FIG. 4 is a lattice structure including inductors L1, L2 and tunable capacitors C1, C2. The capacitors C1, C2 are tuned in response to control signals output by the control circuit 80 of the DSP 30.

Figure 4B:
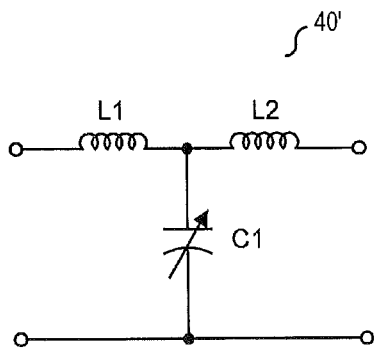

In other embodiments, the tunable all pass filter can be implemented in a T topology, such as the T-filter 40' shown in FIG. 4B, which is the unbalanced equivalent of the lattice filter and has the same phase response. In a T topology, the two inductor branches are mutually coupled, which results in transformer action between the two inductors and an all-pass response even at high frequency.

In other embodiments, the tunable all pass filter can be implemented as a discrete time filter. Discrete-time filters are based on digital FIR filters, but operate at RF frequencies. In a discrete-time filter, the input signal is split into multiple paths, each with a different delay and amplification. The outputs of the paths are then combined. The amplification may be implemented at RF with a vector modulator, a variable gain/attenuator along or with a phase shifter. A discrete time filter may be suitable for use in embodiments in which the RFPPDs are placed after the LNAs.

Figure 5:
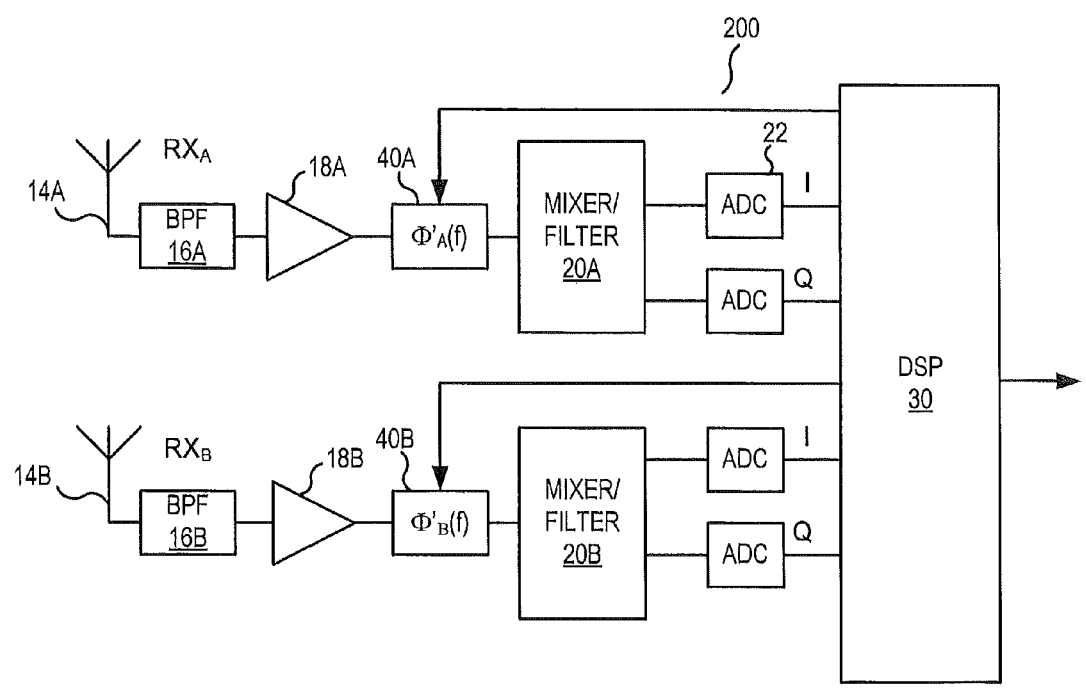
FIGS. 5-7 are block diagrams of multi-antenna receivers in accordance with various embodiments.

Further embodiments of the invention are illustrated in FIG. 5, which illustrates a receiver 200 according to some embodiments. In the receiver 200, the RFPPD components 40A, 40B are placed in the receiver chains after the low noise amplifiers 18A, 18B, in contrast to the embodiments illustrated in FIG. 3 in which the RFPPD components 40A, 40B were positioned ahead of the LNAs 18A, 18B. In the embodiments of FIG. 3, it is assumed to be more desirable to have the RFPPD components 40A, 40B compensate for non-linear behavior of the LNAs 18A, 18B. However, the RFPPD components 40A, 40B can instead be placed after the LNAs 18A, 18B and before the down-conversion mixers 20A, 20B, or before any other non-linear component if the preceding components in the chain are sufficiently linear. In the embodiments shown in FIG. 5, the LNAs 18A, 18B are assumed to be sufficiently linear, and the down-conversion mixers are assumed to be the primary contributors to IMD and HD.

Figure 6:
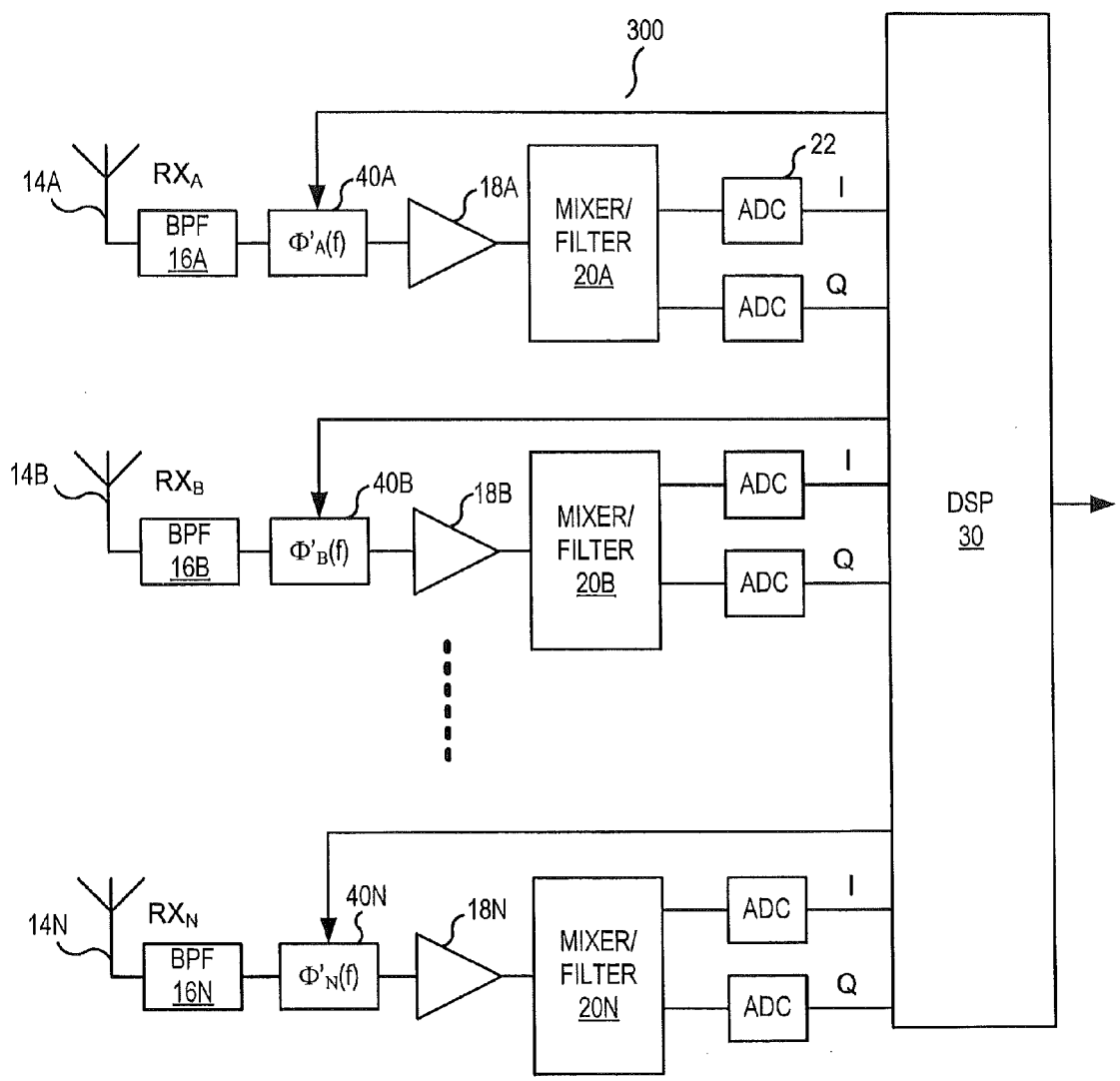

FIG. 6 illustrates a receiver 300 according to some further embodiments. The receiver 300 includes N (where N>2) receiver chains $RX_A$, $RX_B$, ..., $RX_N$ coupled to a DSP 30. In the embodiments of FIG. 6, an RFPPD 40A, 40B, ..., 40N is placed in the signal path of each receiver chain $RX_A$, $RX_B$, ..., $RX_N$. The phase shifts among the different paths may be tuned to ensure IMD and HD components are suppressed at the output of the combiner 70.

Figure 7:
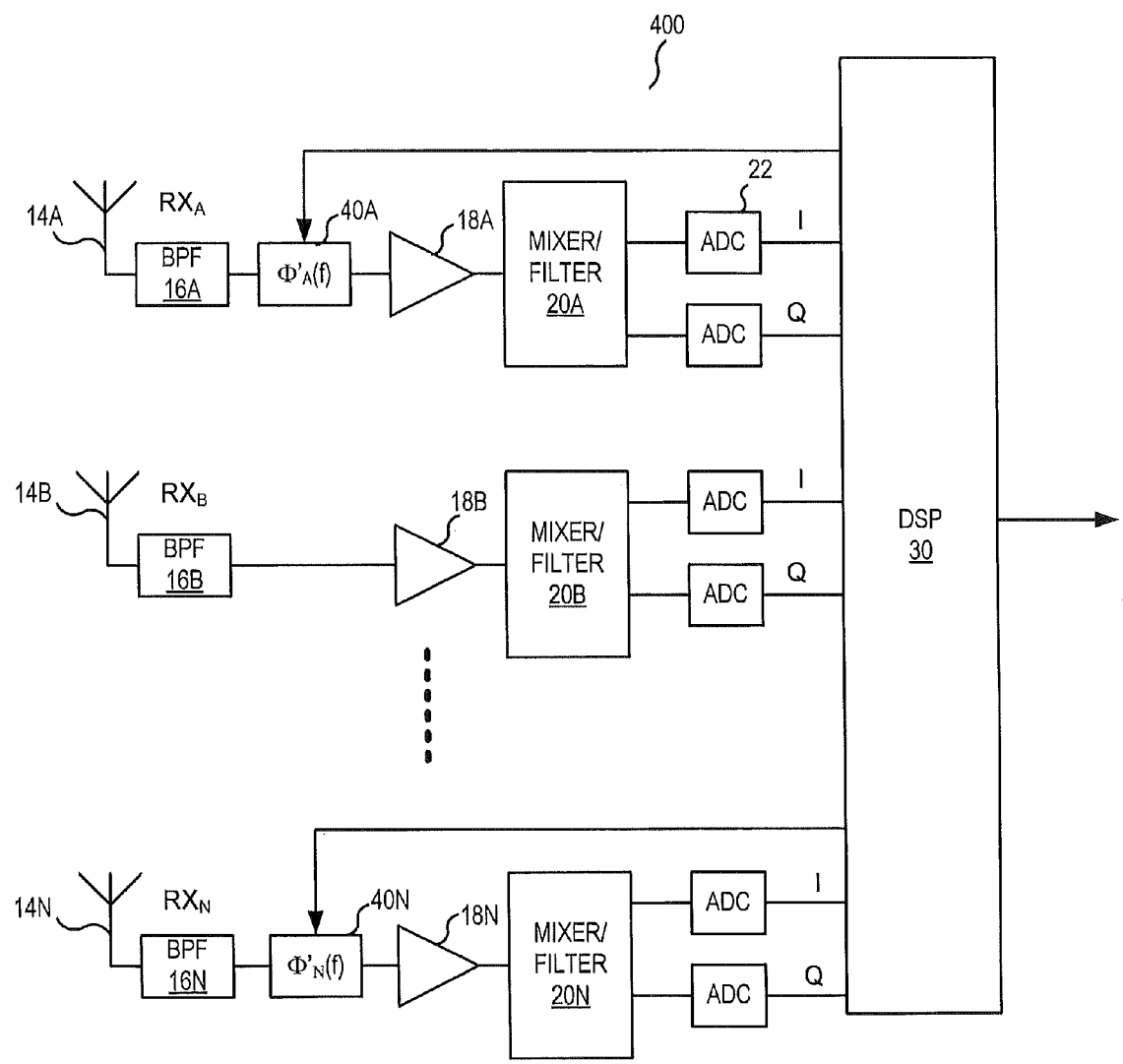

FIG. 7 illustrates a receiver 400 according to some further embodiments. The receiver 400 includes N (where N>2) receiver chains $RX_A$, $RX_B$, ..., $RX_N$ coupled to a DSP 30. In the embodiments of FIG. 7, an RFPPD is placed in some, but not all, receiver chains. As can be seen from Equation [3], if the values of $\phi'_A(f)$ are not controllable, then the values of $\phi'_B(f)$ can still be chosen to achieve the +/−180° condition on $\Delta_{100,IM3}$.

Some embodiments of the present invention provide IMD attenuation in the desired RX channel at baseband. This may permit the receiver components to exhibit some non-linear behavior, which relaxes design constraints.

In some embodiments, all paths in the receiver contain the additional phase shifting components. These embodiments may provide more degrees of freedom for tuning the RFPPD than other embodiments.

However, in other embodiments, not all paths include an RFPPD 40A, 40B, ..., 40N. A reduction in components can result in lower cost and/or smaller size. The control circuit 80 may therefore have fewer degrees of freedom that can be utilized to select appropriate phase shift values, which may cause the control algorithm to have more complexity than in other embodiments.

In some embodiments, if the LNA 18A, 18B is sufficiently linear, then the RFPPD components 40A, 40B can be placed after the LNA 18A, 18B rather than before the LNA 18A, 18B. Insertion loss of components placed prior to the LNA 18A, 18B may have a much more significant impact on receiver performance than if they are placed after the LNA.

Figure 8:
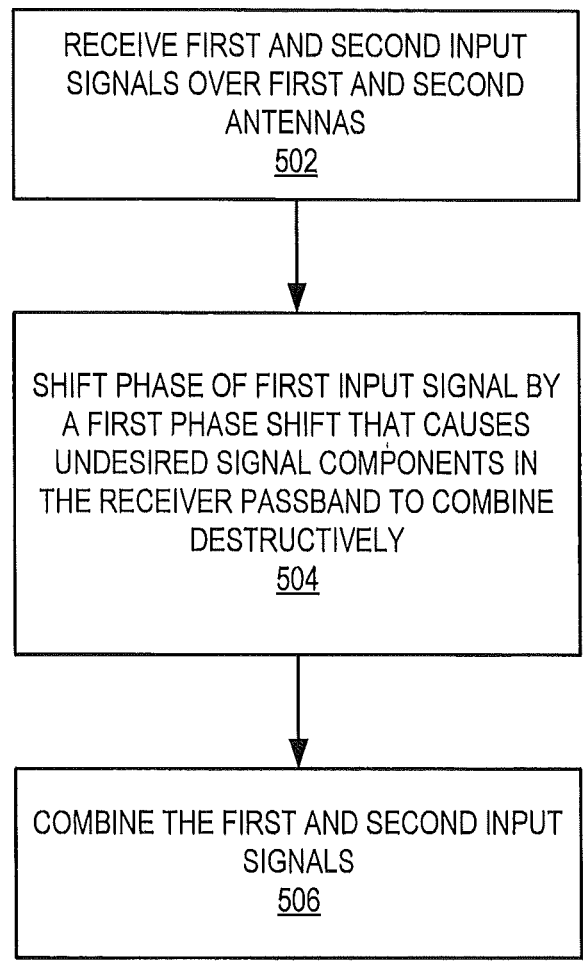
FIG. 8 is a flowchart that illustrates operations for processing a receive signal according to some embodiments.

FIG. 8 is a flowchart that illustrates operations for processing a receive signal according to some embodiments. Referring to FIG. 8, the operations include receiving first and second input signals over first and second antennas (block 502). A phase of the first input signal is shifted by a first phase shift based on the frequencies of interfering signals (block 504). The first and second input signals are then combined (block 506). The first phase shift is configured to cause undesired signals, such as IMD and/or HD components, to combine destructively when the input signals are combined.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A receiver, comprising:
    a first receiver chain configured to receive a first input signal;
    a second receiver chain configured to receive a second input signal;
    a first phase predistorter in the first receiver chain configured to shift a phase of the first input signal by a first phase shift $\phi'_A(f)$;
    a second phase predistorter in the second receiver chain configured to shift a phase of the second input signal by a second phase shift $\phi'_B(f)$; and
    a combiner coupled to the first receiver chain and the second receiver chain and configured to combine the first and second input signals;
    wherein the first phase shift is selected to cause undesired signal components induced in the first and second input signals by nonlinear processing in the receiver to combine destructively;
    wherein the first phase shift and the second phase shift are jointly selected to cause the undesired signal components in the first and second input signals to combine destructively; and
    wherein the undesired signal components comprise intermodulation distortion (IMD) products of a first undesired signal and a second undesired signal, wherein a phase difference between a first one of the IMD products in the first input signal and a second one of the IMD products in the second input signal has the form:

$$\Delta_{\phi,IM3} = 2\Delta'_\phi(f_2) - \Delta'_\phi(f_1)$$

wherein $\Delta'_\phi(f)$ is defined as $(\phi_A(f)+\phi'_A(f))-(\phi_B(f)+\phi'_B(f))$, $f_1$ is a fundamental frequency of the first undesired signal, $f_2$ is a fundamental frequency of the second undesired signal, wherein $\phi_A(f)$ and $\phi_B(f)$ are phase shifts of the first and second input signals, and wherein $\phi'_A(f)$ and $\phi'_B(f)$ are frequency dependent phase shifts selected such that $\Delta_{\phi,IM3}$ is about +/−180 degrees.

2. The receiver of claim 1 further comprising:
    a control circuit coupled to the combiner and to the first phase predistorter and configured to control a phase shift of the first phase predistorter.

3. The receiver of claim 1, wherein the combiner is further configured to multiply the first and second input signals by weights to form weighted input signals and to combine the weighted input signals to form a combined input signal.

4. The receiver of claim 3, further comprising:
    a control circuit coupled to the combiner and to the first phase predistorter and configured to control a phase shift of the first phase predistorter and configured to generate complex weights;
    wherein the complex weights are selected to increase the destruction of the undesired signal components in the first and second weighted input signals when the first and second weighted input signals are combined.

5. The receiver of claim 1, wherein the first receiver chain comprises a low noise amplifier; and
    wherein the first phase predistorter is provided in the first receiver chain between the first input and the low noise amplifier.

6. The receiver of claim 1, herein the first receiver chain comprises a low noise amplifier; and
    wherein the first phase predistorter is provided in the first receiver chain after the low noise amplifier.

7. The receiver of claim 6, wherein the first receiver chain comprises a mixer, and wherein the first phase predistorter is provided in the first receiver chain between the low noise amplifier and the mixer.

8. The receiver of claim 1, wherein the second receiver chain does not include a phase predistorter.

9. The receiver of claim 1, wherein the first phase predistorter comprises an all-pass filter having a tunable phase response.

10. The receiver of claim 9, wherein the first phase predistorter comprises a lattice filter.

11. The receiver of claim 9, wherein the first phase predistorter is free of active circuit components.

12. A method of prosessing a signal that is received on multiple antennas, comprising:
    receiving a first input signal from a first antenna;
    receiving a second input signal from a second antenna;
    shifting a phase of the first input signal by a first phase shift $\phi'hd A(f)$;
    shifting a phase of the second input signal by a second phase shift $\phi'_{B\ (f);\ and}$
    combinina the first and second input signals;
    wherein the first phase shift is selected to cause undesired signal components induced in the first and second input signals by nonlinear processing to combine destructively;
    wherein the first and second phase shifts are selected to cause the undesired signal components in the first and second input signals to combine destructively; and
    wherein the undesired signal components comprise intermodulation distortion (IMD) products of a first undesired signal and a second undesired signal, wherein a phase difference between a first one of the IMD products received in the first input signal and a second one of the IMD products received in the second input signal has the form:

$$\Delta_{\phi,IM3} = 2\Delta'_\phi(f_2) - \Delta'_\phi(f_1)$$

wherein $\Delta'_\phi(f)$ is defined as $(\phi_A(f)+\phi'_A(f))-(\phi_B(f)+\phi'_B(f))$, $f_1$ is a fundamental frequency of the first undesired signal, $f_2$ is a fundamental frequency of the second undesired signal, wherein $\phi_A(f)$ and $\phi_B(f)$ are phase shifts of the first and second input signals, and wherein $\phi'_A(f)$ and $\phi'_B(f)$ are frequency dependent phase shifts selected such that $\Delta_{\phi,IM3}$ is about +/−180 degrees.

* * * * *